May 30, 1967  G. W. TOADVINE  3,322,457
VEHICLE FOR TRANSPORTING CONCRETE PIPE
Filed Oct. 21, 1965
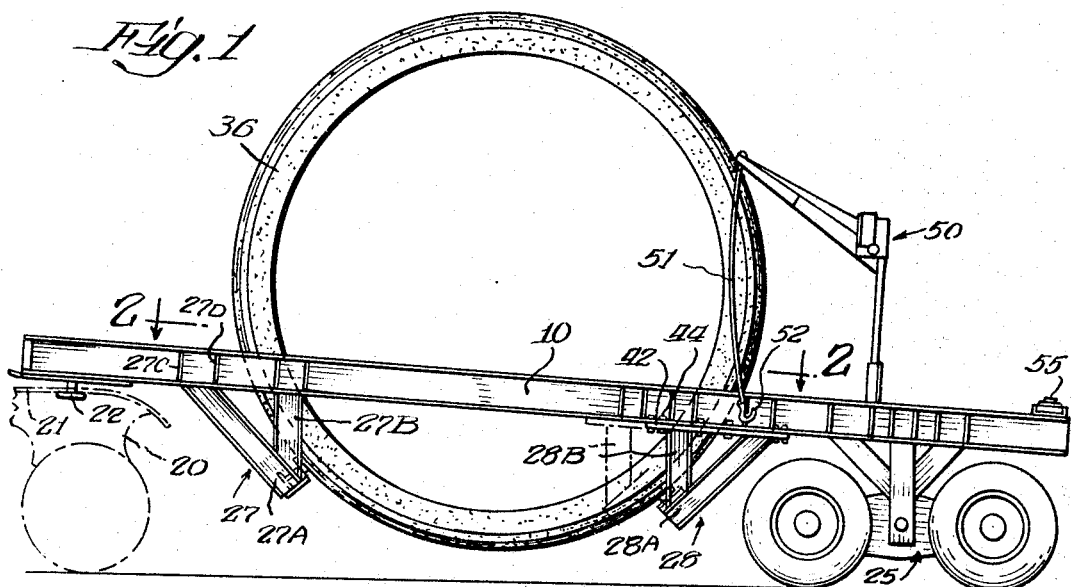
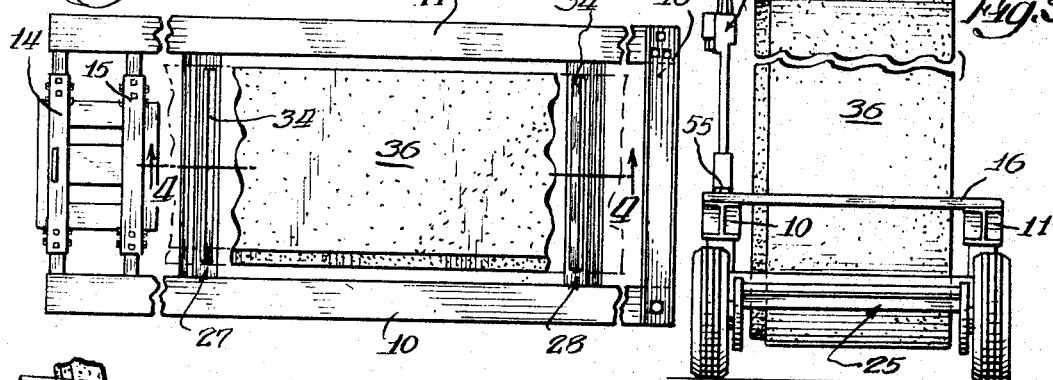
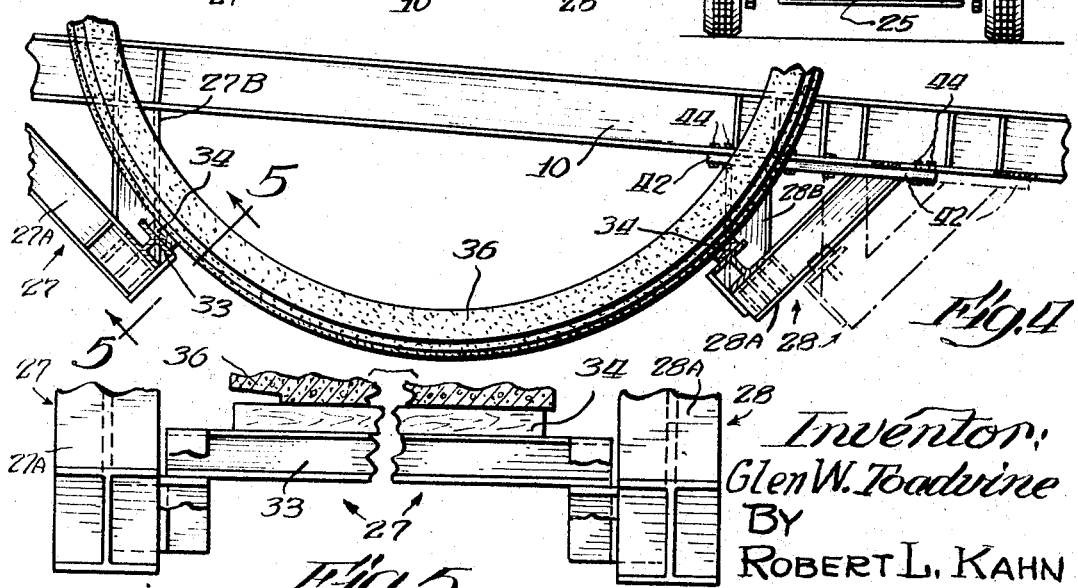
Inventor:
Glen W. Toadvine
By
Robert L. Kahn
Atty.

United States Patent Office 3,322,457
Patented May 30, 1967

3,322,457
VEHICLE FOR TRANSPORTING CONCRETE PIPE
Glen W. Toadvine, Miamisburg, Ohio, assignor to Price Bros. Company, Dayton, Ohio, a corporation of Michigan
Filed Oct. 21, 1965, Ser. No. 500,113
3 Claims. (Cl. 296—4)

This invention relates to a vehicle for transporting concrete pipe and particularly large diameter concrete pipe of the order of about 14 feet. Concrete pipe of the above general diameter comes in comparatively short lengths, such as about 6 feet. In the transport of such pipe over streets and highways, there is present the problem of overhead and lateral clearance to the project site. It is therefore desirable to support the pipe so that its axis is as low as possible to provide adequate overhead clearances and reduce the required width to an absolute minimum.

Due to the large size and weight of a length of pipe under consideration here, the transport of such pipe along public or private roads involves trailers (usually semi-trailers) pulled by tractors. In fact, one pipe length per trailer is the only practical manner of transporting.

In accordance with the present invention, a vehicle for handling one length of pipe is provided. A vehicle embodying the present invention is adapted to support a length of pipe with the pipe axis extending across the vehicle length. The new vehicle is provided with pipe supports forming a cradle permitting a pipe to lie low enough so that clearance between the bottom of a pipe and the surface or ground over which the pipe is hauled is reduced to a minimum. As a result of the manner of pipe transport, the top of the pipe is generally below the standard minimum clearance prevalent over most highways for bridges, overpasses and the like. Means are provided in the new vehicle for accommodating various size pipe while still maintaining desired clearance between the bottom of the pipe and the road surface over which the pipe is being transported.

In general, the vehicle is provided with long side rails on each side of the pipe length and has a pipe length resting between such rails and extending below such rails and supported on a cradle structure. The cradle structure is adapted to support a pipe length so that the vehicle and load will not only have ample overhead clearance but will also have a generally low center of gravity for stability. In order that the invention may be understood, reference will now be made to the drawings wherein:

FIG. 1 is a side elevation of a semi-trailer embodying the present invention having a length of pipe supported thereby, one of the cradle members being shown in dotted line position when adjusted for smaller diameter pipe, the rear portion of a tractor also being illustrated in dotted lines.

FIG. 2 is a plan view along line 2—2 of FIG. 1.

FIG. 3 is a rear elevation of the semi-trailer and load illustrated in FIG. 1.

FIG. 4 is a detail on line 4—4 of FIG. 2, FIG. 4, however, illustrating the cradle adjusted for a smaller diameter pipe, with the cradle adjustment for larger diameter pipe being illustrated in dotted lines.

FIG. 5 is a detail of the semi-trailer on line 5—5 of FIG. 4.

The vehicle illustrated here is a semi-trailer but can be a complete trailer with front and rear axles.

The semi-trailer has two I beams 10 and 11 extending for the full length of the semi-trailer with the webs being generally vertical. I beams 10 and 11 are connected by transverse beams 14 and 15 at the front and 16 at the rear for maintaining I beams 10 and 11 parallel to form a rigid skeleton. It is understood that the various beams are of steel and suitably dimensioned for the particular load to be handled. The transverse beams are preferably bolted to beams 10 and 11 for obtaining various widths of trailers.

The semi-trailer illustrated here may, if desired, be a full trailer and is adapted for hauling by a tractor, the rear part 20 only being indicated in dotted lines. The tractor has suitable means for coupling to the semi-trailer, such means being generally designated as the fifth wheel mechanism and includes as part thereof tractor plate 21 of conventional construction for cooperative with kingpin 22 carried by the front end of the semi-trailer. Tractor plate 21 is provided with the usual locking mechanism. Since the invention is not concerned with the details of the tractor hitch, no more detailed description is believed to be necessary.

The rear portion of the semi-trailer includes a rear axle assembly generally designated as 25, this particular assembly being of the two axle type. The entire assembly may be permanently anchored to the semi-trailer body or may be removable therefrom as desired. The front end of the trailer is supported by pads placed under cradle assembly 27 when the tractor hitch is uncoupled from the semi-trailer. Such supporting pads are not shown but are well known in the industry.

I beam 10 supports two cradle assemblies 27 and 28. I beam 11 also supports similar cradle assemblies. Cradle assemblies 27 are near the front end of the semi-trailer and normally are permanently attached in position. Each assembly 27 has a suspension portion on each side of the semi-trailer welded to the bottom flange of each of beams 10 and 11. The two suspension portions are similar. Each suspension portion has short I beam portions 27A and 27B which are welded to the bottom flanges of each of beams 10 and 11 on the outer surfaces thereof. Reinforcements for beams 10 and 11 at the regions from where beams 27A and 27B extend are provided. Such reinforcements may comprise small metal strips 27C and 27D between the flanges of each of beams 10 and 11. Added reinforcements may be provided. Short beam portions 27A and 27B meet below the level of beams 10 and 11 and between cradle assembly 27 for each beam. Removable cross beam 33 is supported between the meeting region of portions 27A and 27B. Cross beam 33 has its web generally normal to the adjacent pipe surface and has disposed over the outer flange face pad 34 of dense rubber, or other suitable material for providing a resilient but firm bed for the outside of concrete pipe 36 to rest upon without damage to the concrete. As illustrated in FIGS. 1 and 4, the web of cross beam 33 extends generally horizontally in the direction toward pipe 36. Thus, pad 34 will be generally tangent to the outer surface of pipe 36. Precise tangency is not necessary since the pad is sufficiently yieldable so that the pipe will be fully supported. Pad 34 extends for substantially the length of pipe 36.

Cradle assemblies 28 are generally similar to assemblies 27 except that each cradle assembly is adapted to be adjusted over a desired range along beams 10 and 11 of the semi-trailer to accommodate various diameters of pipe. Thus each assembly 28 of the cradle structure has on each side of the semi-trailer depending short beam supports 28A and 28B which are secured to mounting plates 42 extending longitudinally of I beams 10 and 11. Mounting plate 42 is secured to the bottom flanges of I beams 10 and 11 by bolts 44 passing through the beam flanges and the mounting plates. The I beams are provided with a number of regularly spaced apertures to match corresponding apertures in mounting plates 42 so that bolts 44 may be used to suspend the cradle portions from the semi-trailer skeleton structure in any one of a number of different positions. Reinforcements for beams 10 and 11 extending between the flanges of each beam are provided at every position for cradle suspension.

The remainder of cradle structures 28 insofar as cross beam 33 and pipe supporting pad 34 are concerned, is the same as with cradle assemblies 27. For convenience, hoist 50 is bolted to the upper flange of I beam 10 at any suitable location. Hoist 50 is available on the market and is provided with suitable mechanism and connections to be operated either by air or electric power for the purpose of handling rear beam 33 during the loading and unloading operation. Hoist 50 has wire rope 51 and hook 52 which may be anchored in a suitable location along I beam 10. Such hoists are well known and form no part of the present invention. Cross beam 16 can be provided with pad 55 along the top thereof so that beam 16 can be swiveled clear during the loading and unloading operation.

The construction makes it possible for large diameter pipe to be rolled off the trailer rear end for delivery to a job site in an upright position at a precise spot rather than on a side as normally transported. The width of the trailer required for operation is substantially less than that normally required for large diameter pipe. It is clear, therefore, that such a trailer can be used on narrow streets, highways and the like, and can be operated in busy traffic with minimum interference thereto. The construction of the trailer furthermore requires minimum unloading—storage space for pipe and the storage place for a vertically disposed pipe can be so disposed that a contractor requiring pipe for laying can readily engage the pipe and swing the pipe into place.

While the trailer can be used with a conventional tractor, it is especially desirable to have a tractor with a vertically adjustable hydraulic fifth wheel arrangement permitting the front end of the trailer to be elevated by the fifth wheel for desired clearance above ground when ruts are present or when the pipe is to slide off the rear end of the trailer. It is also possible to reduce ground clearance by the hydraulic fifth wheel dropping the front end of the trailer.

The removable beam arrangement makes it possible to adapt the trailer width to various lengths of large diameter pipe. Thus, to increase the width of the trailer for accommodating different lengths of pipe, transverse beams 14 and 15 and cross beams 33 and 16 of proper length are employed.

What is claimed is:

1. A vehicle for transporting a length of large diameter concrete pipe, said vehicle comprising two laterally offset parallel generally horizontal beams forming the longitudinal portion of said vehicle, a plurality of transverse beams adjacent the two ends of said first named beams secured thereto to provide in plan view a generally rectangular vehicle frame, means extending below said frame for supporting said frame on wheels for transport, said frame having a clear region between said beams for accommodating a length of pipe therein with the pipe axis horizontal and transverse of said vehicle and adapted to have a portion of said pipe extending below the level of said beams and the remainder of said pipe extending above said beams, cradle means carried by said frame and extending downwardly therefrom for supporting the pipe, said cradle means including a pair of front assemblies and a pair of rear assemblies, each assembly including two depending support portions below the longitudinal beams and a transverse cross portion between the support portions for a pair of assemblies for engaging an outer area longitudinally of the pipe length, said two pipe engaging portions being spaced apart along the length of said vehicle a distance less than the diameter of said pipe so that said pipe can rest upon said pipe support cross portions, means for joining one pair of said cradle assemblies to said frame beams, said remaining pair of assemblies including base plates forming part of said assemblies and to which said depending portions are secured, and means for adjustably securing said base plates to the longitudinal beams for controlling the longitudinal spacing between the pairs of assemblies to provide adjustment for different diameter pipes, a pipe length being carried so that the bottom of said pipe has a small predetermined clearance above ground during transport, said vehicle and load having a low center of gravity, said longitudinal beams being detachably secured to the transverse beams to accommodate different lengths of pipe.

2. The vehicle according to claim 1 wherein the adjustable cradle assembly is the rear assembly and wherein the adjustable securing means includes bolts passing through selected registering apertures in the longitudinal beams and base plates.

3. The vehicle according to claim 1 wherein said transverse cross portions have resilient strips for engaging the outer pipe surfaces.

References Cited
UNITED STATES PATENTS 3,147,715   9/1964   Myers _____ 105—367

BENJAMIN HERSH, *Primary Examiner.*

P. GOODMAN, *Assistant Examiner.*